United States Patent
Fukumoto et al.

[11] Patent Number: 5,164,153
[45] Date of Patent: Nov. 17, 1992

[54] CONTROL ROD ASSEMBLY FOR A BOILING WATER REACTOR

[75] Inventors: Takashi Fukumoto; Hiromasa Hirakawa, both of Hitachi; Norio Kawashima, Mito; Yasuhiro Aizawa, Hitachi; Hideaki Ishizaki, Mito, all of Japan

[73] Assignees: Hitachi, Ltd., Tokyo; Hitachi Engineering Co., Ltd., Ibaraki, both of Japan

[21] Appl. No.: 760,498

[22] Filed: Sep. 16, 1991

[30] Foreign Application Priority Data

Sep. 14, 1990 [JP] Japan .................................. 2-242650

[51] Int. Cl.⁵ .............................................. G21C 7/00
[52] U.S. Cl. ...................................... 376/335; 376/333
[58] Field of Search .................. 376/333, 335, 327; 976/DIG. 117, DIG. 119, DIG. 123

[56] References Cited

U.S. PATENT DOCUMENTS

| | | | |
|---|---|---|---|
| 4,581,201 | 4/1986 | Haggstrom et al. | 376/335 |
| 4,874,574 | 10/1989 | Igarashi et al. | 376/333 |
| 4,876,060 | 10/1989 | Yoshioka et al. | 376/333 |
| 4,882,123 | 11/1989 | Cearly et al. | 376/333 |

*Primary Examiner*—Brooks H. Hunt
*Assistant Examiner*—Frederick H. Voss
*Attorney, Agent, or Firm*—Antonelli, Terry, Stout & Kraus

[57] ABSTRACT

A control rod assembly for a boiling water reactor comprises a tie-rod of a cross-shaped section, and four sheaths. Each of the sheaths is of a U-shaped section and mounted to the respective arms of the tie-rod. One or more neutron absorber materials are disposed within a space defined by the arm and the sheath. The neutron absorber material is axially separated into two portions. One of two portions is supported by a supporting member. The other portion is suspended by a handle.

7 Claims, 7 Drawing Sheets

CONTROL ROD ASSEMBLY FOR A BOILING WATER REACTOR

FIELD OF THE INVENTION AND RELATED ART STATEMENT

The present invention relates to a control rod assembly for a boiling water reactor, and more particularly to a control rod assembly having a preferable structure in connection with a mechanical integrity.

In these control rod assemblies, the sheaths of U-shaped cross section are welded to the cross-shaped tie rod at the center of the control rod.

The absorber materials of each wing are enclosed freely in the sheath.

The tie rod and the sheaths provide the strength to support axial, leteral and rotational loads due to scram impact and seismic loading through the life of the control rod.

Recently, the Advanced Boiling Water Reactor (ABWR) represents the next generation of Light Water Reactors to be introduced into commercial operation.

The ABWR incorporates the electric-hydraulic Fine Motion Control Rod Drive system, which provides electric fine rod motion during normal operation and hydraulic pressure for scram insertion.

Reduced maintenance with reduced radiation exposure is a feature of the new drive.

It is known that this type of drive system requires little higher hydraulic pressure for scram insertion rather than that of a conventional rocking piston control rod drive because of the difference of the drive mechanism. This higher pressure results the higher scram loading, especially for a control rod assembly at the inoperative buffer system scram event.

Therefore, the control rod assembly coupled to the fine motion control rod drive system requires the mechanical integrity to withstand scram impact loading.

OBJECT AND SUMMARY OF THE INVENTION

Accordingly, an object of the present invention is to provide a control rod assembly having an enough mechanical integrity and can be applied to the fine motion control rod drive system.

To this end, according to the present invention, the neutron absorber materials are separated into two axial portions, one of which is fixed to the handle and the other of which is fixed to the connector plates.

The functions and the advantages of the present invention will be apparent from the description of the preferred embodiments described in detail with referring to the accompanying drawings.

DETAILED DESCRIPTION OF PREFERRED EMBODIMENTS

Figure 1:
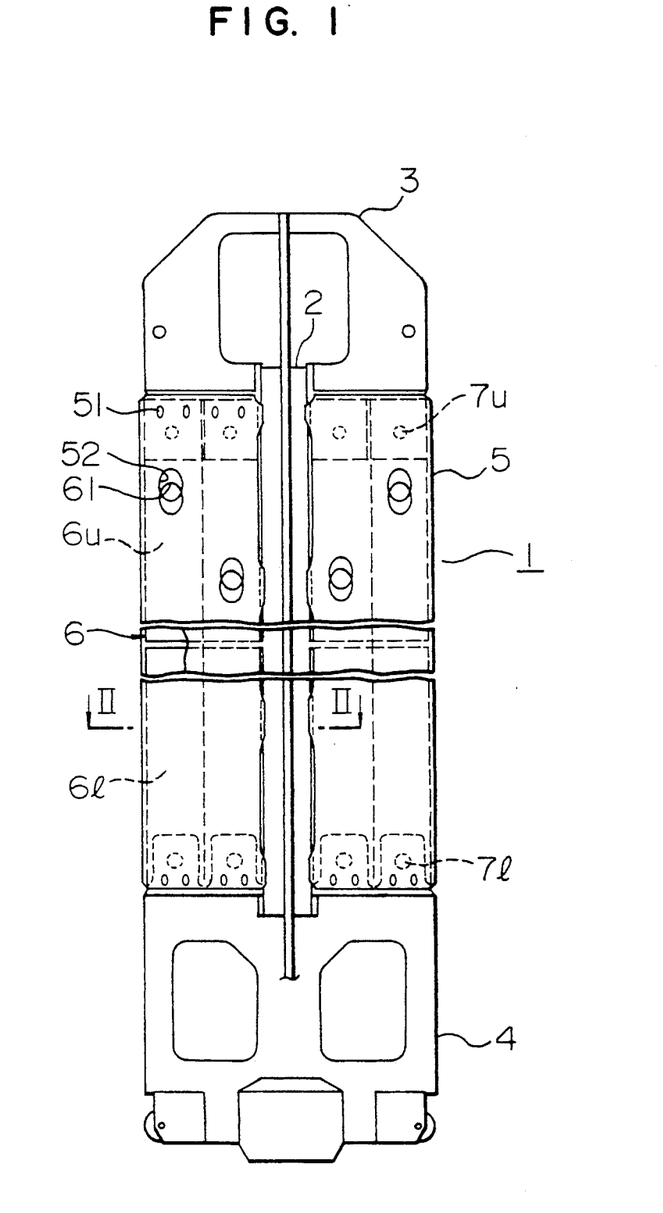
FIG. 1 is a front view showing an embodiment of the present invention.
Figure 2:
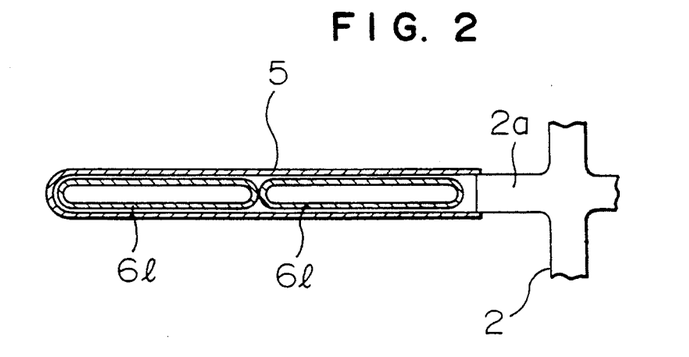
FIG. 2 is a sectional view taken along the lines II—II in FIG. 1.

Referring to FIGS. 1 and 2, a control rod assembly 1 comprises a tie-rod 2 of a cross shaped section, a handle 3 and a connector plate 4 to be connected to a coupling (not shown). The handle 3 and the connector plate 4 are mounted onto the opposite axial ends of the tie-rod 2, respectively. A sheath 5 of U-shaped cross section is mounted onto the respective arms 2a of the tie-rod 2. One or more hafnium neutron absorber material 6 of ellipsoidal tubular is disposed within a space defined by the tie-rod arm 2a and the sheath 5. The neutron absorber material 6 is axially separated into two halves, namely an upper tube portion 6u and a lower tube portion 6l. The sheath 5 is provided with a plurality of ellipsoidal openings 51 and 52 through which a coolant passes. The neutron absorber material is also provided with a plurality of ellipsoidal openings 61 which partially coincide with the ellipsoidal openings 52. The coolant passes between the interior of the sheath and the interior of the neutron absorber material through the openings 51, 52 and 61.

Figure 3:
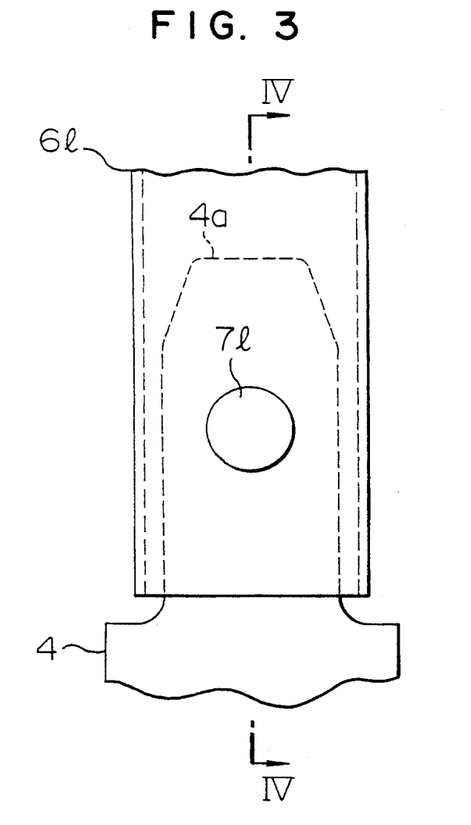
FIG. 3 is a partially fragmentary front view showing a fixture between the neutron absorber materials and the supporting member.
Figure 4:
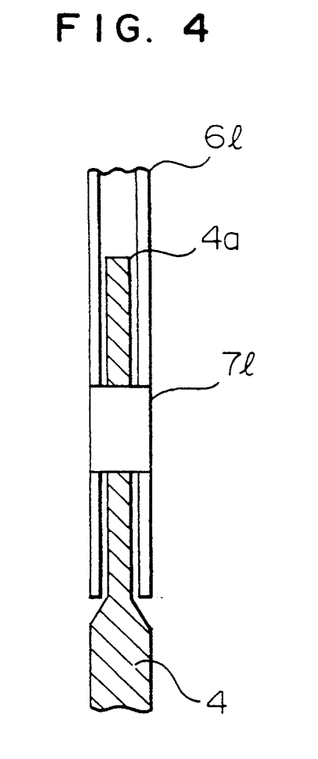
FIG. 4 is a sectional view taken along the lines IV—IV in FIG. 3.

The neutron absorber materials 6 are fixed to the handle 3 and the connector plate 4 through fixture pins 7. As shown in FIGS. 3 and 4, the connector plate 4 is formed with a tongue projection 4a which is capable of being inserted into the ellipsoidal interior of the lower neutron absorber tube portion 6l. The tongue projection 4a and the lower neutron absorber tube portion 6l are fixed together by a fixture pin 7l penetrating therethrough. Further, the handle 3 is also formed with a tongue projection 3a which is capable of being inserted into the ellipsoidal interior of the upper neutron absorber tube portion 6u. The tongue projection 3a and the upper neutron absorber tube portion 6u are fixed together by a fixture pin 7u penetrating therethrough.

Figure 5:
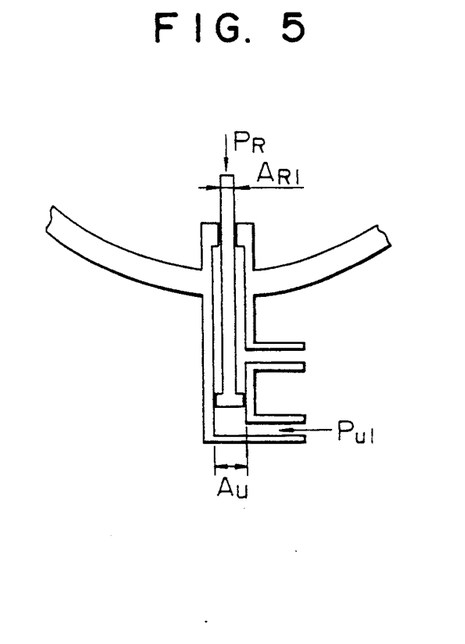
FIG. 5 is a schematic sectional view showing a conventional control rod drive system.
Figure 6:
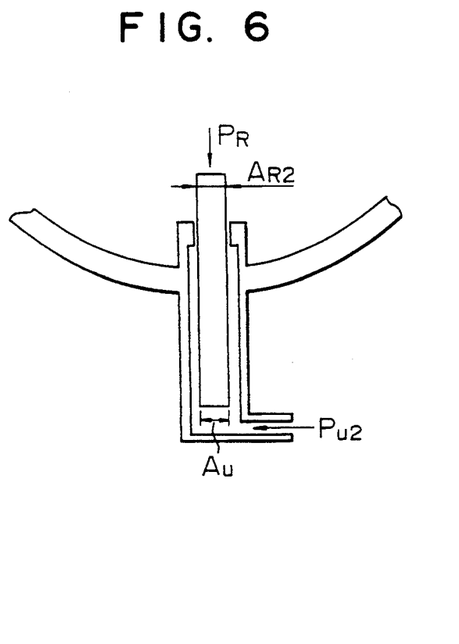
FIG. 6 is a schematic sectional view showing a fine motion control rod drive system.

In comparison of the conventional control rod drive system (FIG. 5) and the fine motion control rod drive system (FIG. 6), when the pressure in the pressure vessel is a rated one $P_R$ (about 70 Kg/cm$^2$), insertion times of both systems are substantially identical to each other on scram operation. In this case, the respective driving forces $F_C$, $F_F$ are obtained by subtracting a product of the vessel pressure $P_R$ and a top cross section $A_{R1}$, $A_{R2}$ of the control rod assembly from a product of an insertion pressure $P_{U1}$, $P_{U2}$ and a bottom cross section $A_U$. Namely, the driving forces are obtained by the following equations:

$$F_C = P_{U1} \times A_U - P_R \times A_{R1}$$

$$F_F = P_{U2} \times A_U - P_R \times A_{R2}$$

The top cross section of the fine motion control rod drive system is some times larger than that of the conventional control rod drive system. Therefore, in the fine motion control rod drive system, in order to overcome the force from the pressure vessel, it is required to make the insertion pressure higher, namely $P_{U1} < P_{U2}$.

However, if the vessel pressure $P_R$ is reduced close to the atmospheric pressure, the driving force $F_F$ is relatively increased since the insertion pressure $P_{U2}$ is high, thereby increasing the load applied to the control rod assembly. Further, in the fine motion control rod drive system, since the stiffness or rigidity of the associated structure member is high, the load applied to the control rod assembly on the scram becomes higher.

Next, the relationship between the load applied on the neutron absorber material 6 on the scram operation and the weight ratio of the upper tube portion 6u to a whole tube 6 will be considered.

Figure 7:
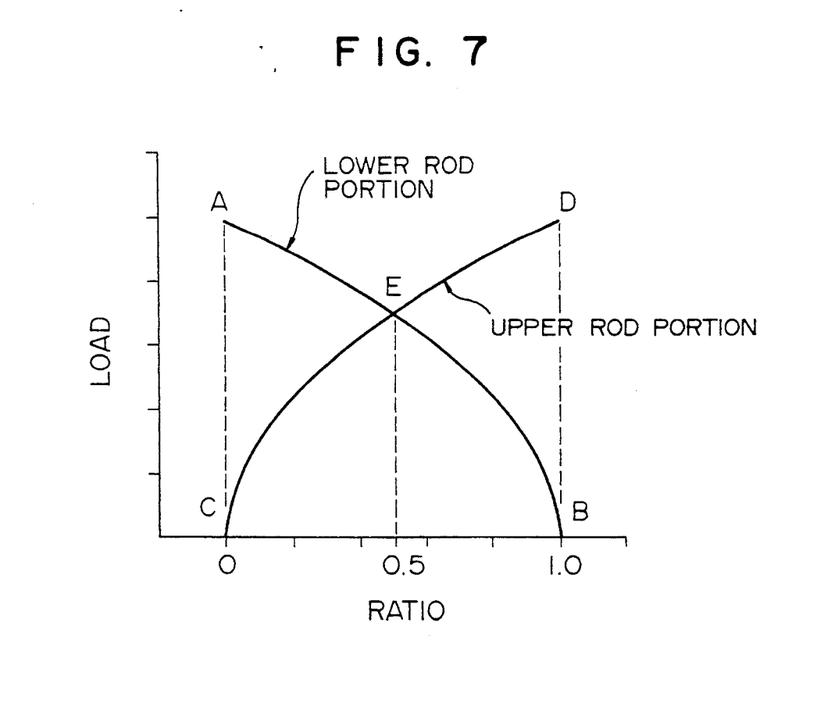
FIG. 7 is a graph showing a relationship between the weight ratio of the upper tube portion to a whole tube and the load.

Referring to FIG. 7, the abscissa represents a weight ratio R of the upper tube portion 6u to a whole tube 6 on the condition that the weight of the whole tube 6 is constant. R=0 means that the weight of the upper tube portion 6u is zero, namely the whole tube 6 is supported by the connector plate 4 without separating the rod 6. To the contrary, R=1 means that the upper tube portion 6u is a whole tube 6, namely the whole tube is suspended by the handle 3 without separating the tube 6.

The ordinate represents the non-dimensional index representing the load applied to the neutron absorber tube 6 on the scram operation.

Figure 8:
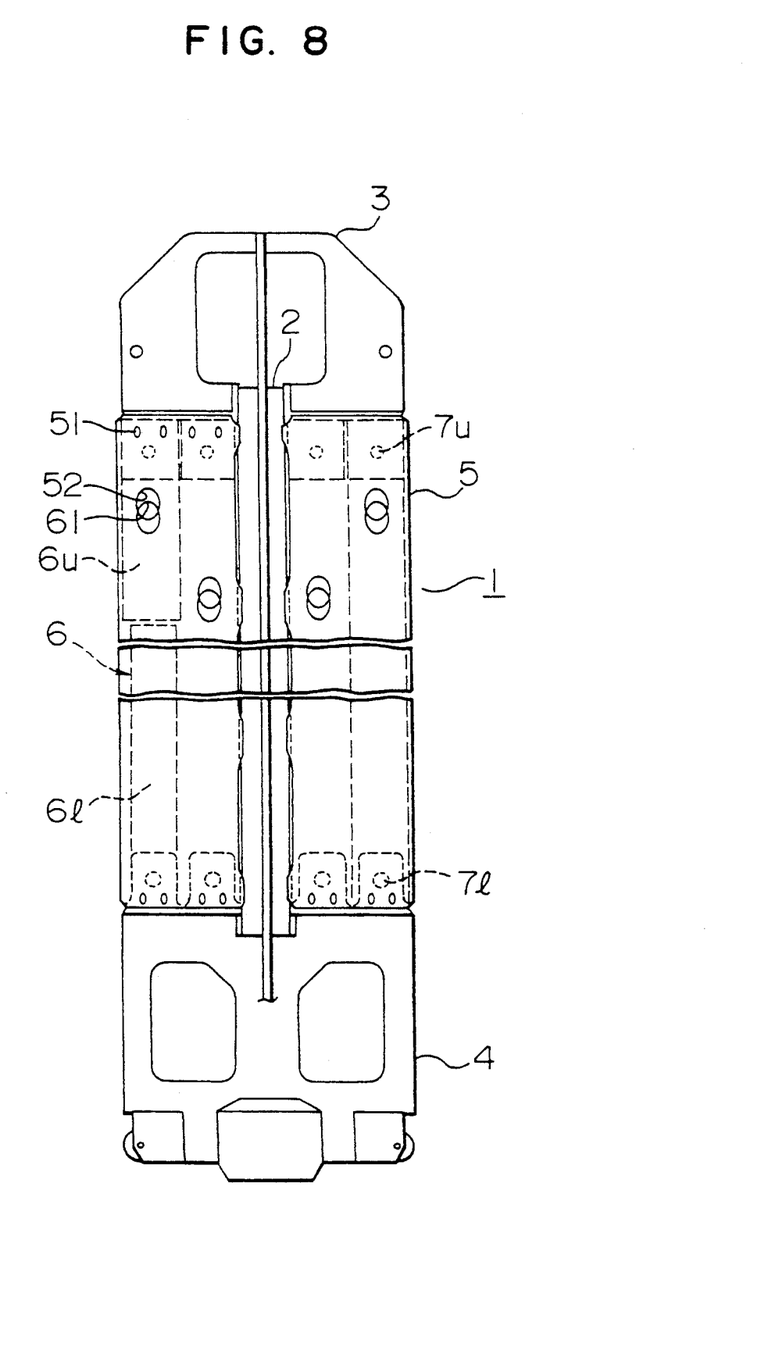
FIGS. 8 and 9 are front views showing other embodiments of the present invention, respectively.
Figure 9:
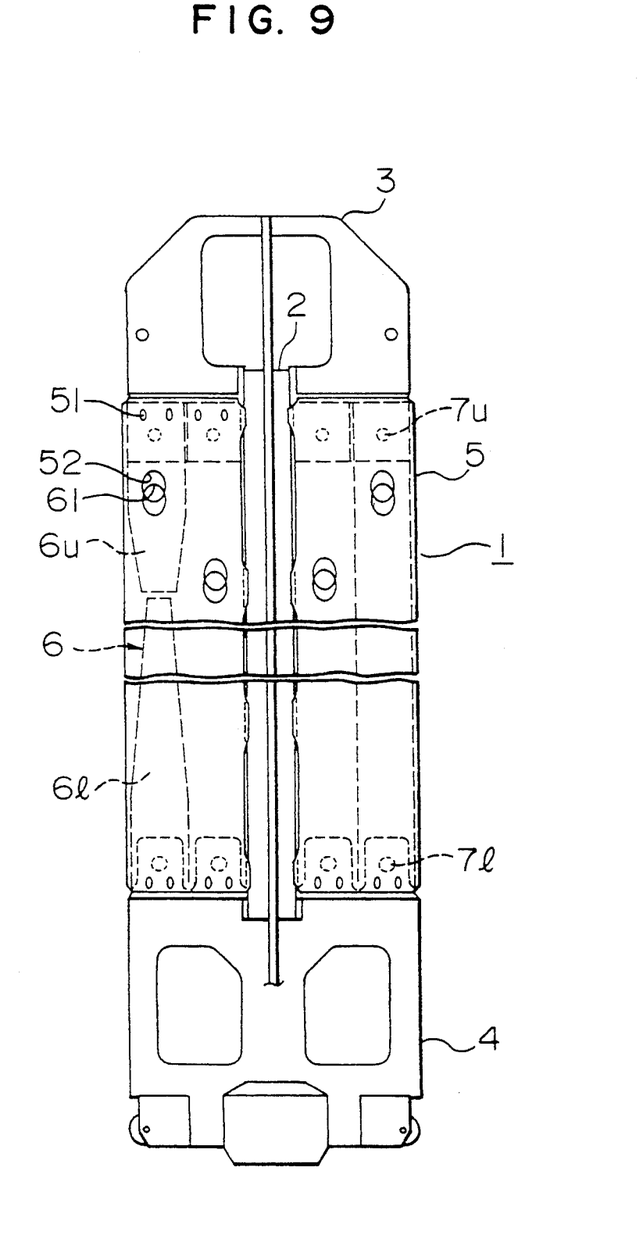

According to the theory of linearly, since the impact load is proportional to the square root of the mass of the neutron absorber material, the maximum tensile load applied on the lower tube portion 6l varies along the distribution A-E-B according to the weight ratio R. The maximum tensile load applied on the upper tube portion 6u varies along the distribution C-E-D according to the weight ratio R. Therefore, the maximum tensile load applied on the neutron absorber tube 6 varies along the distribution A-E-D according to the weight ratio R. Accordingly, it is- possible to minimize the maximum tensile load applied to the neutron absorber tube 6 by means of controlling the weight ratio R correspond to the point E, namely making the weight ratio R close to about 0.5 ($R \approx 0.5$). In order to make the weight ratio R equal to 0.5, as shown in FIG. 1, the neutron absorber tube 6 is axially separated into two halves 6u and 6l, and the ratio of effective cross sectional area of the upper tube portion 6u to that of the lower tube portion 6l is made to be 1.0. On the contrary, it may be possible that the ratio of effective cross section area is made not to be 1.0 neutron absober tube 6 is axially separated into two portions by an appropriate rate (FIG. 8). Further, it may be possible to change not only the effective cross section area ratio but also the axial separation rate (FIG. 9).

The advantages in case that the neutron absorber tube 6 is axially separated into an upper tube portion 6u and a lower tube portion 61 which are held by the handle 3 and the connector plate 4, respectively will be explained by referring to FIGS. 10 and 11 by means of a dynamic analysis using a concentrated mass-spring system model in wich the neutron absorber tube 6 shown in FIG. 1 is axially divided into four quarter elements, in comparison with the prior art I in which the whole neutron absorber tube 6 is suspended by the handle 3 without separating the neutron absober tube 6 and with the prior art II in which the whole neutron absorber tube 6 is supported by the tube connector plate 4 whithout separating the neutron absorber tube 6.

Figure 10:
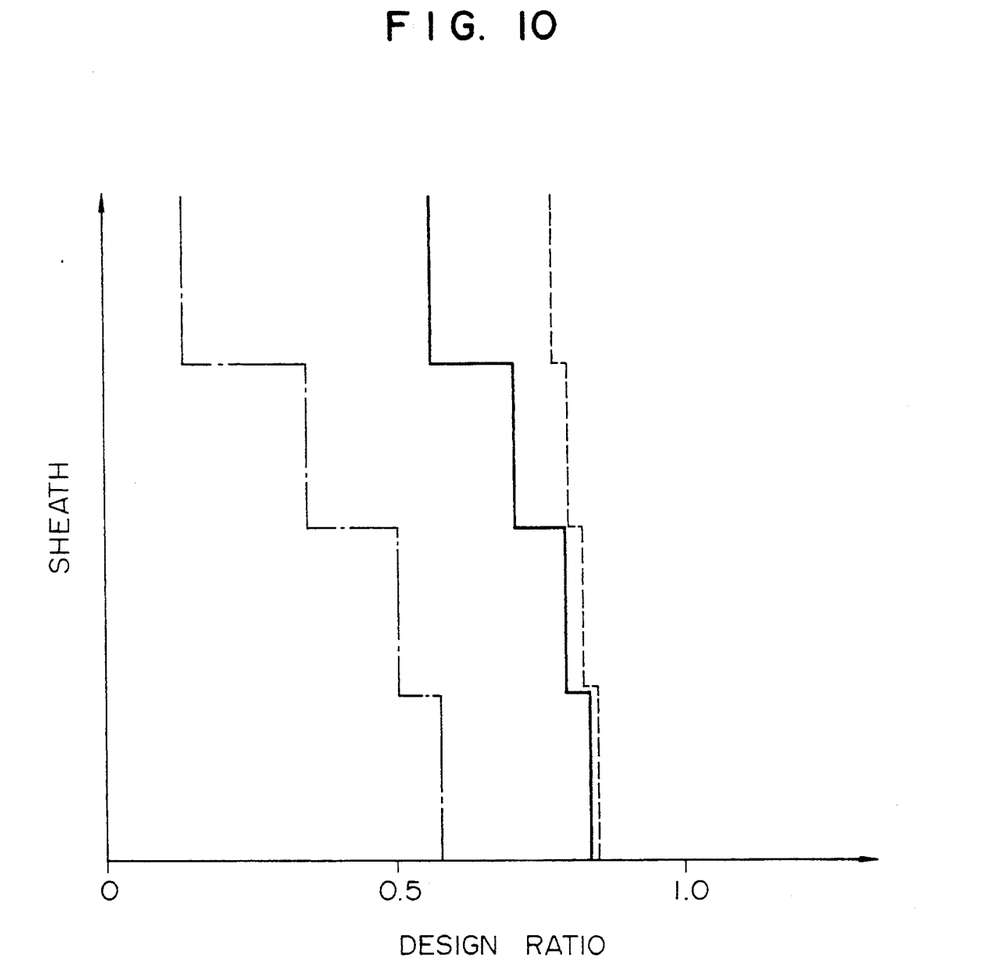
FIGS. 10 and 11 are graphs showing a ratio of a design rate to the sheath and a ration of a design rate to the neutron absorber material, respectively.

In FIG. 10, the abscissa represents a design ratio of the scram load applied on the sheath 5 to the allowable load thereof, and the ordinate represents the axial position in the sheath 5. The solid line represents the present embodiment, the broken line represents the prior art I, and the dashed line represnts the prior art II. As apparent from FIG. 10, in case of the prior art I, since the whole weight of the neutron absorber tube 6 is suspended by the handle 3, namely the sheath 5, the design ratio is generally high and is maximum at the lower end of the sheath 5 in which the sheath 5 carries not only the whole weight of the neutron absorber tube 6 but also the sheath's own weight. To the contrary, in case of the prior art II, since the whole weight of the neutron absorber tube 6 is supported by the connector plate 4, namely the sheath 5 doesn't carry the neutron absorber tube 6, the design ratio is generally low. In case of the above-mentioned embodiment, the design ratio is between ones of the prior arts I and II. In any case, the design ratios are less than 1.0, namely the loads applied to the sheath at any position are below the allowable load, thereby holding the mechanical integrity for the sheath.

Figure 11:
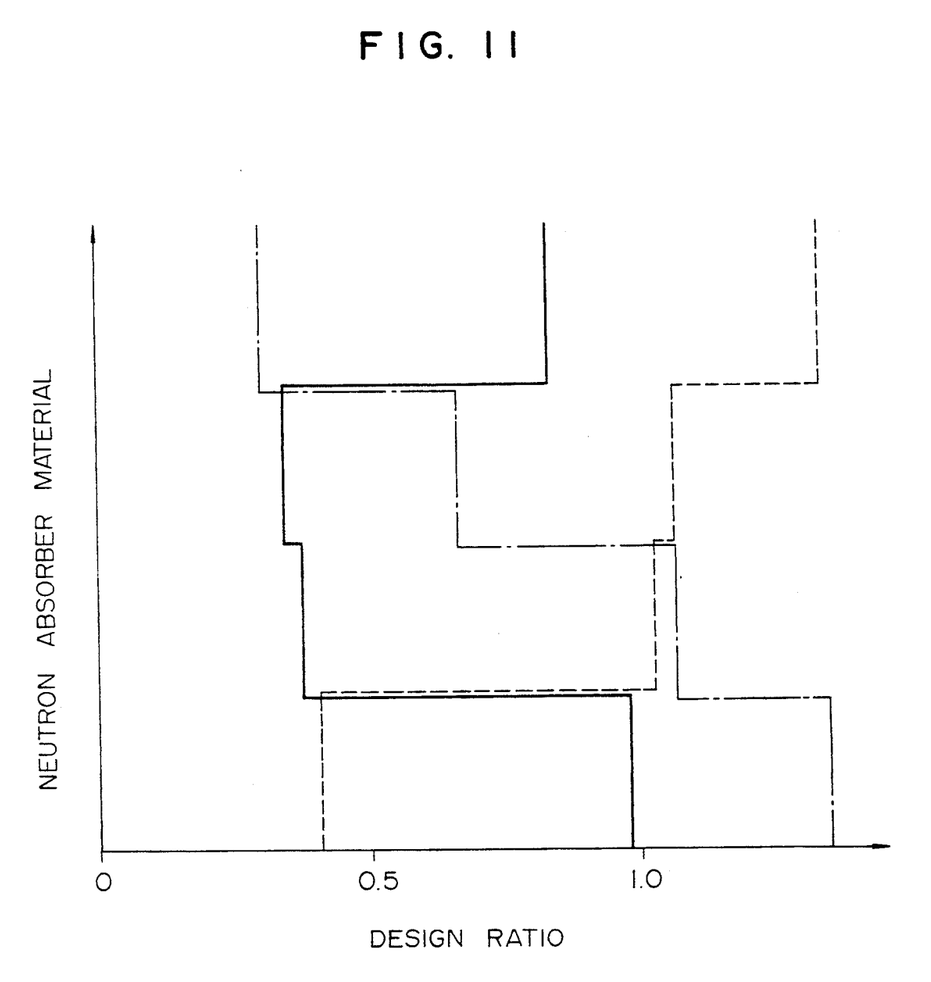

FIG. 11 shows a change of design ratio along the neutron absorber tube 6, which is obtained by means of the above-mentioned dynamic analysis using a concentrated mass-spring system model. The abscissa represents a design ratio of the scram load applied on the neutron absorber tube 6 to the allowable load thereof, and the ordinate represents the axial position in the neutron absorber tube 6. The solid line, the broken line and the dashed line represent the same cases as FIG. 10. As apparent from FIG. 11, in case of the prior art I, the design ratio is maximum at the upper end of the neutron absober tube 6 in which it is subjected to compressive load and carries the neutrol absorber tube's own weight. Further, the design at three-fourth of the neutron absorber tube is beyond 1.0. Namely, the load applied to the neutron absober tube 6 is higher than the allowable load thereof, thereby hardly holding the mechanical integrity for the neutron absober tube. On the other hand, in case of the prior art II, the design ratio is maximum at the lower end of the neutron absorber tube 6 in which it is subjected to tensile load and carries the neutron absorber tube's own weight. Further, the design ration at a lower half thereof is beyond 1.0, thereby hardly holding the mechanical integrity for the neutron absorber tube. To the contrary, in the above-mentioned embodiment, the design ratio of the upper tube portion 6u is higher at the upper end thereof in which it is subjected to compressive load and carries it's own weight, and the design ratio of the lower tube portion 6l is higher at the lower end thereof in which it is subjected to tensile load and carries it's own weight. However, the design ratio at any part of the tube portions 6u and 6l is less than 1.0, thereby holding the mechanical integrity for the neutron absorber tube.

What is claimed is:

1. A control rod assembly for a boiling water reactor comprising:
    a tie-rod having arms extending radial outwards and being angularly spaced from each other;
    four sheaths, each of which is of a U-shaped section, mounted to the respective arms of said tie-rod;
    one or more neutron absorber materials disposed within spaces defined by each of said arms and said sheaths, each of which is axially separated into two portions, upper and lower;
    supporting means to be connected to a control rod drive mechanism, connected to one end portion of said lower portion of said neutron absorber materials; and handle means connected to one end portion of said upper portion of said neutron absorber materials.

2. A control rod assembly according to claim 1, wherein said neutron absorber material is formed by a tube with an ellipsoidal annular cross section.

3. A control rod assembly according to claim 1, wherein said two neutron absorber material portions are substantially identical to each other in weight thereof.

4. A control rod assembly according to claim 3, wherein said two neutron absorber material portions are substantially identical to each other in axial length thereof, and effective cross section areas of said two neutron absorber material portions are axially constant and substantially identical to each other.

5. A control rod assembly according to claim 3, wherein said two neutron absorber material portions are different from each other in axial length thereof, and effective cross section areas of said two neutron absorber material portions vary axially.

6. A control rod assembly according to claim 3, wherein said two neutron absorber material portions are different from each other in axial length thereof, and effective cross section areas of said two neutron absorber material portions are axially constant but different from each other.

7. A control rod assembly according to claim 2, wherein each of said supporting means and said handle means is provided with a tongue projection which is fixed into a ellipsoidal interior of said neutron absorber material portion, and wherein said supporting means and said lower portion are fixed together by means of a fixture pin penetrating said tongue projection and said handle means and said upper portion are fixed together by means of a fixture pin penetrating said tongue projection.

* * * * *